Patented Apr. 19, 1927.

1,625,121

UNITED STATES PATENT OFFICE.

FRANK M. HILDEBRANDT AND CHARLES N. FREY, OF PITTSBURGH, PENNSYLVANIA, ASSIGNORS, BY MESNE ASSIGNMENTS, TO THE FLEISCHMANN COMPANY, A CORPORATION OF OHIO.

METHOD OF TREATING AND PREPARING YEAST AND THE PRODUCT THEREOF.

No Drawing.   Application filed June 4, 1921. Serial No. 475,161.

This invention relates to a method for treating yeast by which the baking strength and fermenting power of the yeast will be increased and which also enables it to be preserved without the loss of these or other properties; and has as its object the carrying out of such treatment in a rapid, economical and efficient manner.

The yeast which is to be treated by the method of our invention may be initially produced by any process of manufacture that is preferred, the method being particularly applicable to bakers' yeast.

Heretofore, after such yeast has been propagated, it has been separated from the spent wort by centrifuging, filtering, pressing, etc., in the well-known way. The yeast thus obtained, after pressing, still retains therefore a considerable amount of water, for example, up to even 65 or 70% by weight. We have found that this yeast, as marketed, is not in the best possible condition; the first step of our method accordingly relates to a treatment for such yeast which will improve its baking strength, fermenting power, keeping qualities, etc.

As an example of the manner in which this step is carried out, the following is given:

The yeast is subjected to slow aeration for an extended period of time in a solution which we term a "conditioning solution" and is characterized by the presence of a large amount of carbo-hydrate, for example, sugar, and a small amount of material containing yeast-assimilable nitrogen, relative to the amount of yeast to be treated. The result of this treatment is to effect a conditioning or ripening of the yeast in such a way as to prevent any considerable multiplication of the cells, as would occur, for example, in case there was an abundant supply of yeast-assimilable nitrogen together with an abundance of carbo-hydrate material.

Any one of several substances containing yeast-assimilable nitrogen may be employed; at present we prefer to use an organic salt of ammonium; for example, ammonium tartrate, since in the use of this, the acid released is not considered to be toxic to the yeast. Moreover we have found that good results may be obtained by supplying in addition a small amount of a substance containing yeast-assimilable phosphorus; for example, secondary calcium phosphate ($CaHPO_4$). Since small amounts of yeast-assimilable nitrogen and phosphorous compounds in yeast nutrient solutions are helpful in assisting the yeast in the utilization of the sugar material present, the use of such compounds may be employed to effect control of the cell modification which is desired. Also, by using only such small amounts, vigorous and extensive growth of the new yeast cells is limited and substantially prevented, while at the same time the conditioning of the cells already present is accomplished.

In order to insure the yeast against infection, it is desirable to have a slight initial acidity in the liquid. This acidity should be preferably of a character harmless to the yeast and we use, for example, a small quantity of lactic acid for accomplishing this purpose.

As a specific example of the materials used to make a conditioning solution in accordance with the practice of our invention the following is given:

| | |
|---|---|
| Yeast (as ordinarily made and marketed) | 100 lbs. |
| Sugar | 40 to 100 lbs. |
| Water | 100 gallons |
| Ammonium tartrate | 1 to 3 lbs. |
| Calcium phosphate | ½ to 2 lbs. |
| Lactic acid | ½ lb. |

The amounts of the various components may of course be varied within certain limits; we have found, for example, that the sugar content may be varied from 2 to 5%, in some instances it may be found advantageous to add from 1% to 1.5% of alcohol to this conditioning solution as it has been found that such an addition may be of value in improving the keeping quality of the conditioned yeast. Aeration is continued until the desired activity of the yeast is terminated or until the sugar is substantially exhausted, the duration of course varying, but generally extending from 3 to 10 hours.

After the period for the conditioning treatment is completed, the yeast is separated from the liquid; the usual method of centrifuging and pressing being adapted to this end. A yeast product, if marketed after such a conditioning treatment, would be of a character superior to that of the ordinary yeast of commerce, having greater baking strength, fermenting power and keeping qualities.

Moreover, yeast which has been subjected to this conditioning treatment is so improved thereby that, when subjected to the improved drying method of our present invention, it retains its vitality to a much higher and more certain and uniform degree than would be the case without previous special conditioning treatment. Microscopic examination of our specially conditioned yeast has shown it to be made up of yeast cells substantially all of which are nearly round, separate, fully developed cells, which are relatively thickwalled and relatively free from buds and from internal granules as compared to ordinary yeast which has been prepared by usual methods of commercial bakers' yeast propagation and which has not been subjected to our special conditioning treatment.

The subsequent treatment enables the yeast to retain these qualities practically indefinitely and is preferably carried out in the following manner:

Yeast treated as above is subjected to conditions which are more or less analogous to those which induce micro-organisms to enter upon their resting stages. One of these conditions is a marked lowering of temperature such as is shown, for example, in our copending application, Serial No. 435,237 filed January 5, 1921, of which this application is a continuation in part.

Another method by which this may be accomplished and which we claim as our invention in the present application comprises a carefully and to a certain extent what may be termed an automatically regulated evaporation of moisture from the yeast after it has been expelled from the yeast cell contents osmotically. There is danger of injuring the vitality of the yeast cells by reason of too rapid changes in the conditions existing within the cells if water is extracted from the cells by any method with undue rapidity and we have found that a product in which a large proportion of the yeast cells retain their vitality and availability for subsequent useful functioning in breadmaking or for other purposes is obtained by the hereinafter-described method or removing water from the yeast.

In carrying out this method the yeast, which may have been prepared by the above described method, is preferably mixed with 30 to 70 parts by weight of corn meal or other suitable material of like character for each 100 parts of yeast and this mixture is treated with a dilute aqueous solution of a suitable innocuous compound or substance which will regulate the drying to which the mixture is afterward subjected. Among the various substances which we have found to be suitable for this purpose are: glycerine, magnesium sulphate, sodium chloride, calcium sulphate, calcium chloride, magnesium chloride, ammonium chloride and ammonium sulphate.

The strength of the solution used may be varied within certain limits, but we have found that good results are obtained by the use of a solution containing from 0.5% to 5% of one or more of these substances. In the use of glycerine, experiments have demonstrated that a solution of 1% to 5% strength gives good results. In the case of magnesium sulphate, solutions of 0.5% to 5% strength have been employed with good results, the best results apparently being given by 1 to 2% solution. With sodium chloride, a 2% solution has been found especially suitable, solutions of 0.9% to 5% however having also been found satisfactory. With calcium sulphate, a saturated solution has been employed. With calcium chloride, ammonium chloride, magnesium chloride and ammonium sulphate 0.5% solutions of each have given good results.

Whichever of these solutions is employed, a suitable quantity of the solution, which may for example amount to about one-half the weight of the yeast employed, is added to the mixture of yeast and corn meal or other suitable absorbent filler and this mixture is then subjected to a drying operation (for example in a current of air passed in contact with thin layers of the yeast mixture) and maintained at such a low temperature (for example at 17 to 18 degrees centigrade) that the vitality of the yeast is not destroyed by undue heating. During this drying the temperature in any event is not permitted to rise above about 30° C. and, according to the conditions prevailing, the drying may require a period of from 10 to 30 hours. During this drying operation water is very gradually eliminated from the interior of the yeast cells by exosmosis. This water commingles with the solution, with which the yeast has been treated and which forms what may be termed a protecting or osmotically acting layer around the exterior of the yeast cells, and, from this surrounding and protecting solution, water is evaporated by the air current. As this evaporation proceeds and as the solution surrounding the yeast cells consequently becomes more concentrated, water is more readily taken out of the yeast cells osmotically, but is less readily evaporated from the progressively increasingly concentrated solution adjacent the exterior of the yeast cells, so that a slow regulated abstraction of water from the interior of the yeast cells is effected without any sudden changes in the cells' condition. A vacuum may be employed to assist in the drying but is not necessary.

If desired, small quantities of a substance containing yeast-assimilable nitrogen may be included (together with the other compounds employed such as calcium chloride or calcium sulphate) in preparing the solution with which the yeast mixture is treated before evaporation of moisture therefrom. Such nitrogenous materials entering into the composition of the resultant product may have a beneficial influence upon the development and functioning of the yeast when it is subsequently employed as for example in bread-making.

As a merely illustrative specific embodiment of the second step of our invention, 100 parts of conditioned yeast, preferably previously conditioned as hereinabove described, and which usually contains about 70% of water, more or less, is mixed with 70 parts of corn meal in its ordinary condition as it occurs in commerce. Although this cornmeal is said to be "dry" yet in fact it may contain as much as 10% of moisture. To this resultant mixture there are added 50 parts of any suitable treating solution such as one of those above specified, for example a saturated aqueous solution of calcium sulfate. This solution is suitably added to the mixture at a temperature of about 18° C. or preferably at a somewhat lower temperature and the mixture of yeast, meal and protective solution is then subjected to a slow gradual evaporative drying operation as hereinbefore described, which may advantageously be terminated when the mixture as an entirety has a moisture content of 10% to 13%. We have found that in ordinary practice the quantity of water in the finally dried product should not exceed about 15%.

Previous to the addition of the aqueous solution to the mixture of yeast and corn meal or like material, there may be added to the mixture (considering it as composed of yeast 100 parts and corn meal 70 parts, for example) 7 parts, more or less, of a highly refined, non-volatile and relatively inert hydrocarbon oil such as one of the general type and characteristics of the highly refined medicinal mineral oils, such as "paraffinum liquidatum" (U. S. P.) or with similar materials of low melting point, such as petrolatum. The addition of such an oil not only improves the keeping quality of the product to some extent but it is also believed that it may have a beneficial influence as an additional protective agent in that it assists in the regulation and retardation of the abstraction of water from the yeast. If it be desired merely as an auxiliary protective agent, such as oil may be added after the drying, but we have obtained best results by addition of the oil, as described, prior to addition of the aqueous solution.

While we have mentioned corn meal as a suitable absorbent filler, and have found it especially suitable as such, other fillers also may be employed and among such other fillers which we have found it possible to use for the purpose are: oatmeal, wheat meal, rice polish, a mixture of wood flour and wheat flour, potato starch, potato flour and a mixture of potato starch with malt. Whatever filler is selected or employed, it should, for best results, be comparatively free from any readily fermentable substances.

What we claim is:

1. The steps of a method of treating yeast subsequent to propagation, which comprise causing yeast to pass into a dormant state by surrounding the cells with a coating having osmotically-acting properties of such strength that it tends so slowly to abstract moisture from the cells that the vitality of the yeast is not destroyed, and subjecting the mass to drying.

2. The steps of a method of treating yeast subsequent to propagation, which comprise causing yeast to pass into a dormant state by surrounding the cells with a coating having osmotically-acting properties of such strength that it tends so slowly to abstract moisture from the cells that the mass is adapted to be dried at normal pressure and at a low temperature without destroying the vitality of the yeast, and drying the mass under normal pressure and low temperature conditions.

3. The steps of a method of treating yeast subsequent to propagation, which comprise causing yeast to pass into a dormant state by forming a mixture of the yeast with a solid, insoluble, absorbent filler, and with such a quantity of a solution of an osmotically-acting substance as will form a coating which tends so slowly to abstract moisture from the cells that the mass is adapted to be dried at normal pressure and at a low temperature without destroying the vitality of the yeast, and drying the mass under normal pressure and low temperature conditions.

4. The steps of a method of treating yeast subsequent to propagation, which comprise causing yeast to pass into a dormant state by forming a mixture of the yeast with a solid, insoluble, absorbent filler, and with such a quantity of a solution of calcium sulfate as will form an osmotically-acting coating which tends so slowly to abstract moisture from the cells that the mass is adapted to be dried at normal pressure and at a low temperature without destroying the vitality of the yeast, and drying the mass under normal pressure and low temperature conditions.

5. The steps of a method of treating yeast subsequent to propagation which comprise causing yeast to pass into a dormant state by forming a mixture of 100 parts of the yeast with 70 parts of corn meal and 50 parts of a saturated aqueous solution of calcium sulfate, whereby the cells are surrounded by an osmotically-acting coating which tends so slowly to abstract moisture from the cells that the mass is adapted to be dried at normal pressure and at a temperature of about 18° C. until its moisture content is reduced to about 13% or less without destroying the vitality of the yeast, and drying the mass under normal pressure and low temperature conditions.

6. The method of treating yeast subsequent to propagation for enabling it better to retain its baking properties, which comprises causing a yeast product to undergo a conditioning fermentation without substantial cell multiplication in a nutrient solution containing sugar and yeast nourishing salts, causing the conditioned yeast to pass into a dormant state by surrounding the cells with a coating having osmotically-acting properties of such strength that it tends so slowly to abstract moisture from the cells that the mass is adapted to be dried at normal pressure and at a low temperature without destroying the vitality of the yeast, and drying the mass under normal pressure and low temperature conditions.

7. The method of treating yeast subsequent to propagation for enabling it better to retain its baking properties, which comprises causing a yeast product to undergo a conditioning fermentation without substantial cell multiplication in a nutrient solution containing sugar and yeast nourishing salts, causing the conditioned yeast to pass into a dormant state by forming a mixture of the yeast with a solid, insoluble, absorbent filler, and with such a quantity of a solution of an osmotically-acting substance as will form a coating which tends so slowly to abstract moisture from the cells that the mass is adapted to be dried at normal pressure and at a low temperature without destroying the vitality of the yeast, and drying the mass under normal pressure and low temperature conditions.

8. A dried bakers' yeast product in which a majority of the yeast cells present are adapted to retain their viability when preserved at ordinary atmospheric temperatures for a period of at least one month, and which has been prepared by causing bakers' yeast to pass into a dormant state by surrounding the cells with a coating having osmotically-acting properties of such strength that it tends slowly to abstract moisture from the cells, mixing therewith a solid insoluble absorbent filler, and drying the mass under normal pressure at low temperature conditions.

9. A dried bakers' yeast product in which a majority of the yeast cells present are adapted to retain their viability when preserved at ordinary atmospheric temperatures for a period of at least one month, and which has been prepared by mixing about 100 parts of yeast with about 50 parts of a saturated aqueous solution of calcium sulphate, and 70 parts of corn meal, and slowly drying the mass in a current of air at a temperature of about 18° C., or lower until its moisture content is reduced to about 13% or slightly less.

10. A dried bakers' yeast product in which a majority of the yeast cells are nearly all round, separate and fully developed cells substantially free from buds, and are adapted to retain their viability when preserved at ordinary atmospheric temperatures for a period of at least one month, and which has been prepared by pretreating bakers' yeast to develop the cells uniformly, and subsequently causing the yeast to pass into a dormant state by surrounding the cells with a coating having osmotically-acting properties of such strength that it tends slowly to abstract the moisture from the cells, mixing therewith a solid insoluble absorbent filler, and drying the mass under normal pressure at low temperature conditions.

In testimony whereof, we affix our signatures.

FRANK M. HILDEBRANDT.
CHARLES N. FREY.